Patented Nov. 24, 1953

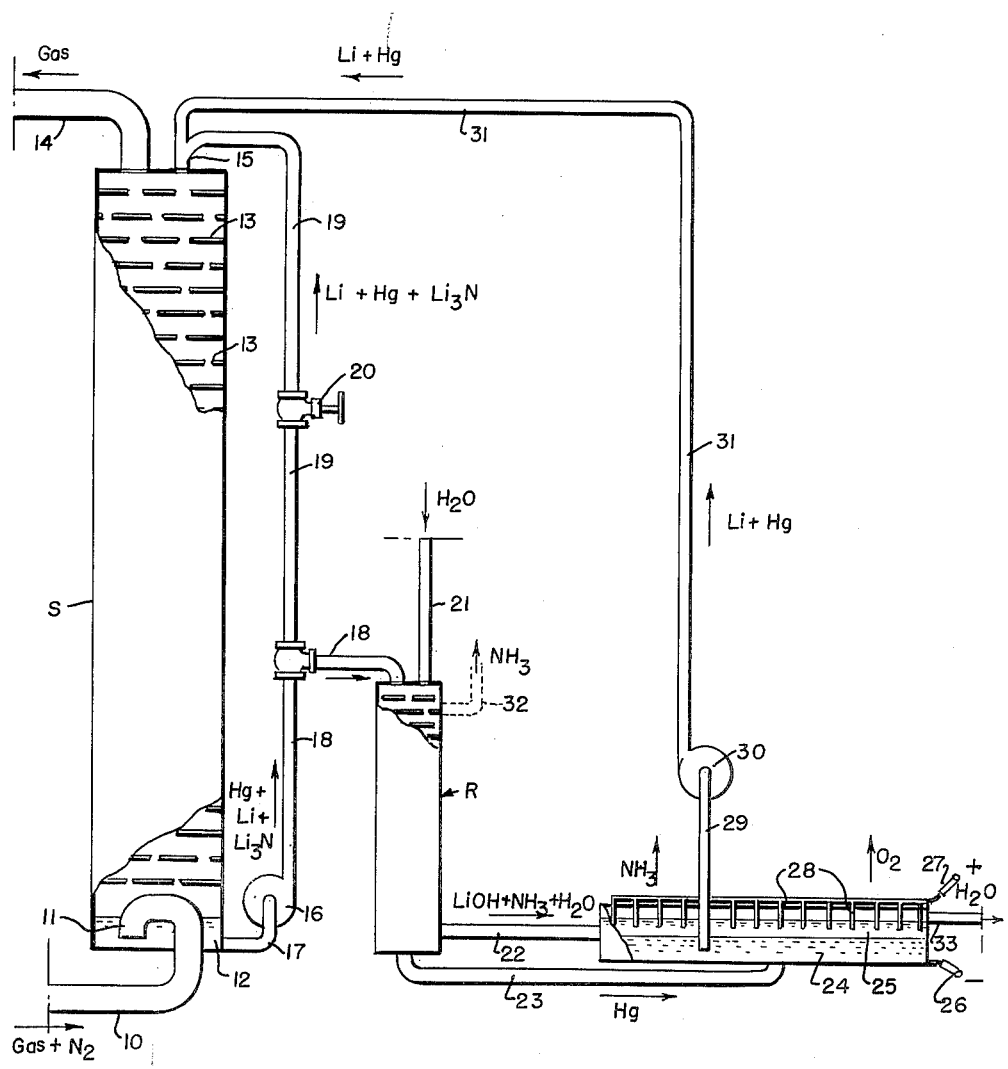

2,660,514

UNITED STATES PATENT OFFICE 2,660,514

REMOVAL OF NITROGEN FROM MIXTURES OF COMBUSTIBLE GASES

Frederick A. Rohrman, Boulder, Colo.

Application April 8, 1949, Serial No. 86,245

8 Claims. (Cl. 23—3)

This invention relates to the extraction or removal of nitrogen from a gas or gaseous mixture containing the same and, although not limited thereto, is particularly applicable to the removal of nitrogen from natural gas.

The natural gases of some of the eastern fields, as in Pennsylvania, are reported to have a relatively low concentration of nitrogen, such as less than 1%, while the natural gases of certain other eastern fields, as in Ohio, are reported to have nitrogen concentrations of around 3%. However, the natural gas from some of the western fields, such as that near Hugoton, Kansas, may contain as much as 10% or more of nitrogen. Needless to say, when this natural gas is pumped through pipe lines for several hundred miles, the cost of pumping the inert gas, which adds nothing to the B. t. u. content of the gas, may become considerable. Also, the rate at which the gas may ultimately be sold may be dependent upon its B. t. u. content, and a concentration, even on the order of 10% of an inert gas such as nitrogen, reduces not only the B. t. u. content but, in consequence, the price which may be received for such gas. Normally, the natural gases contain a very low amount of water vapor, some being substantially anhydrous, and this is of considerable benefit to the process of this invention, although a gaseous mixture which contains water vapor can be treated for the removal of nitrogen, in accordance with this invention.

Among the objects of the present invention are to provide a process of extracting or removing nitrogen from a gas or gaseous mixture containing the same; to provide such a process which is particularly applicable to the removal of nitrogen from natural gas or other combustible gas or mixture of gases; to provide such a process which can be readily carried out on a commercial scale; to provide such a process which may be made relatively efficient; to provide such a process which may be varied as desired, in accordance with different conditions and operating problems; to provide such a process which may be carried out continuously; to provide such a process in which any relatively expensive materials may be recycled, so as to be used over and over again; to provide such a process in which loss of relatively expensive materials is negligible; and to provide such a process, the cost of which is economically feasible in view of the advantages derived from the removal of nitrogen, particularly from natural gas or other combustible gas mixtures.

Additional objects and the novel features of this invention will become apparent from the description which follows.

In general, the process of this invention, for the removal of nitrogen from a gas or gaseous mixture containing the same, involves the contacting of the gas or gaseous mixture with lithium mercury amalgam. Lithium is a highly reactive metal, being especially reactive with water and oxygen, but also will react with nitrogen to form lithium nitride, or $Li_3N$. While the reaction of metallic lithium with nitrogen may be relatively difficult to carry out, due to the presence of a film of lithium oxide or lithium hydroxide on each particle of lithium, when lithium is amalgamated with mercury, such a non-reactive film appears to be absent, and, in operations carried out in accordance with the present invention, the lithium in the amalgam has reacted with nitrogen at normal atmospheric temperatures. However, the reaction may be carried out at higher temperatures, when beneficial, as to increase the reaction rate or to permit the use of other lithium alloys. Low melting point alloys, such as "Woods" metal, "Lipowitz" metal, and other eutectic fusible alloys, which usually contain various proportions of bismuth, antimony, lead, tin, cadmium, zinc or indium, and which form an alloy with lithium, may be utilized instead of mercury, which is generally preferred. Since an amalgam is defined (Metals Handbook, 1948 edition) as an alloy of mercury, the term "low melting point alloy of lithium," as used herein, refers to lithium mercury amalgam as well as lithium alloyed with a low melting point alloy.

A specific advantage of the process of this invention lies in the fact that, since mercury is a liquid, although relatively heavy, the lithium mercury amalgam is also a liquid, and can, in general, be handled as such. Thus, the amalgam can be pumped through piping, and can be reacted with the gas or gaseous mixture from which the nitrogen is to be removed in normal liquid-gas contact apparatus, such as contact towers, or other reaction or scrubbing apparatus. Thus, the reaction of the lithium mercury amalgam with the gas from which the nitrogen is to be removed is readily carried out, with the formation of lithium nitride. Also, the lithium nitride can be separated or, preferably, carried along by the liquid mercury to further steps in the process. The reaction between lithium and nitrogen, in which the mercury apparently plays little part, although the possibility that the mercury may act as a catalyst should not be entirely discarded, is as follows:

$$6Li + N_2 \rightarrow 2Li_3N$$

The above reaction between lithium and nitrogen will also take place when the lithium is alloyed with a low melting point, eutectic fusible alloy, the reaction, of course, being carried out at a temperature above the melting point of the alloy used. Also, when carried out at such temperatures, the lithium alloy may be handled as a liquid, i. e. pumped, and reacted in normal liquid-gas contact apparatus.

In further accordance with this invention, the lithium may be recovered for re-amalgamation with the mercury, or again to be alloyed with a low melting point, eutectic fusible alloy. Preferably, because of the ease of reaction, the lithium nitride is reacted with water to form lithium hydroxide and ammonia, which reaction may be represented as follows:

$$Li_3N + 3HOH \rightarrow 3LiOH + NH_3$$

Of course, the ammonia so produced is normally substantially immediately dissolved in or absorbed by any unreacted water, which may tend to decrease the amount of water available for additional reaction. However, with slightly in excess of substantially molar quantities, a substantial proportion of the ammonia may be separated as a gas, and drawn off for further use, either for sale as ammonia per se, dissolved in water, or utilized in conventional reactions to produce nitrogenous materials, such as fertilizers.

In still further accordance with this invention, the lithium hydroxide, either with or without the ammonia or ammonia and water, is treated in an electrolysis cell in the presence of mercury. Preferably, the mercury is utilized as a liquid cathode in the cell, so that the lithium, either as free metal or ions, will preferentially amalgamate with the mercury, to form additional lithium mercury amalgam, which can then be recycled to remove additional nitrogen from the gas being treated. In the electrolysis cell, there is, of course, production of hydrogen at the mercury cathode, but in operations carried out in accordance with this invention, it was found that the lithium amalgamated with the mercury, apparently in preference to the absorption of hydrogen by the mercury. Also, hydroxyl ions produced during electrolysis apparently combined to form water and split off oxygen, in accordance with the following equation:

$$4LiOH \rightarrow 4Li + O_2 + 2H_2O$$

Thus, in the electrolysis cell, oxygen is produced at the anode, not only from the electrolysis of water per se, but primarily from the electrolysis of the lithium hydroxide. When the lithium is alloyed with a low melting point alloy, such as of the type described above, the fusible alloy will be utilized as a liquid cathode in the cell, in substantially the same manner as mercury, the temperatures used, of course, being above the melting point of the alloy. Because of the previous reaction of lithium nitride with water, it may generally be desirable to use an alloy having a melting point below the boiling point of water.

The above reactions may be carried out in the manner illustrated in the accompanying drawing, which is a flow sheet of the process of this invention. The gaseous mixture containing the nitrogen which is to be removed therefrom, at least in part, may be introduced at the lower end of a scrubber S, through a pipe 10, which may be provided with a gooseneck 11, so that the gas or gaseous mixture may first be bubbled through a pool 12 containing any unreacted lithium mercury amalgam, in addition to mercury and lithium nitride. The gaseous mixture passes upwardly in the scrubber S, in countercurrent relation to the amalgam, the latter flowing downwardly over successive contact means 13, such as baffle plates, checkerwork, or the like. The gas, from which all or a portion of the nitrogen has been removed, is discharged from the upper end of the scrubber S, through an outlet pipe 14, while the lithium mercury amalgam (and, when desired, any unreacted amalgam re-circulated from the pool 12) is introduced at the upper end of the scrubber S through an amalgam inlet pipe 15. The mercury, containing lithium nitride and any unreacted amalgam, passes from the pool 12 to a pump 16, through a pump inlet line 17, while the pump discharge line 18 leads to the upper end of a reactor R, with a branch line 19, provided with a valve 20 for controlling or shutting off the recirculating flow, leading to the amalgam inlet 15.

Water is introduced into the reactor R, as at the upper end through a water inlet 21, so that the lithium nitride will react with the water to form lithium hydroxide and ammonia. The lithium hydroxide, ammonia and any excess water may be conveyed through a pipe 22 to the mid or upper portion of an electrolysis cell C, while the heavier mercury, which will tend to settle out in the reactor R, passes through a lower pipe 23 to the lower portion of cell C, there to form a mercury cathode pool 24. The lithium hydroxide, or aqueous solution thereof, forms a liquid body 25 in the cell C, above the mercury cathode pool 24, while the negative or cathode wire 26 is connected to the mercury cathode pool 24 in a suitable manner, as by a plate (not shown) immersed therein. The anode wire 27 may be connected with a plurality of anode plates 28, which extend down into the liquid body 25, to form numerous paths for the passage of current from the cathode pool 24 to the anode plates 28, so that the lithium hydroxide will be converted by electrolysis into lithium, oxygen and water. Of course, there may be some production of hydrogen at the mercury cathode pool 24, and this hydrogen, except for the presence of lithium, would tend to be absorbed by the mercury. However, the lithium appears to preferentially amalgamate with the mercury, and to replace hydrogen which may have been absorbed by the mercury, thus increasing the lithium content of the mercury cathode pool 24. The lithium mercury amalgam so produced is drawn off from the pool 24, passing through a pipe 29 to a pump 30, the discharge line 31 of which leads directly to the amalgam inlet 15 of the scrubber S, so that the lithium and mercury may be recycled.

If desired, the ammonia may be permitted to separate in the reactor R and drawn off there, as through a pipe 32, shown in dotted lines, although due to the strong tendency for ammonia to be absorbed by water, a water and ammonia solution, probably relatively concentrated, will tend to pass from the reactor R to the cell C. The excess water produced in the cell, which may contain some ammonia, may be drawn off from the cell C in any suitable manner, such as through a pipe 33 disposed just below the level of the liquid body 25 in the cell C, while the oxygen produced, which will tend to pass to the anodes, and also any gaseous ammonia, may be drawn off from the top of the cell, as through suitable piping. Preferably, primarily because of the possible presence of some LiOH carried thereby, the water drawn off from the cell at pipe 33 is recycled to the reactor R, as by being pumped to the water inlet 21. Since hydrogen of the water supplied to the reactor R combines with nitrogen to form NH₃, and also because oxygen is formed in the cell C, the water from pipe 33 will normally not be sufficient to supply the total water needed at the reactor, so that additional quantities of water must be supplied to the reactor R, which may amount to substantially the entire needs of the reactor, after the process has been in operation for some time, but by recycling the water from pipe 33, the possibility of losing even small amounts of lithium is avoided.

It will be understood, of course, that other types of scrubbers, reactors, electrolytic cells, and other equipment adapted to carry out the process of this invention may be utilized, instead of the types illustrated in the drawing. For instance, various "Castner" type cells, normally used in the electrolytic production of chlorine, may be utilized as the electrolysis cell C.

In the event that the incoming gas or gaseous mixture contains an amount of water vapor which might tend to unduly decrease the lithium in the lithium mercury amalgam or low melting point alloy available for reaction with nitrogen, the gas or gaseous mixture may be dried in a suitable manner, or a sufficient amount of the water vapor removed, as by passage of the gas through or in contact with suitable material, preferably material which preferentially absorbs water vapor, such as silica gel, calcium chloride, or other desiccating agents, or in any desired conventional manner.

From the foregoing, it will be evident that the process of this invention fulfills to a marked degree the objects and requirements hereinbefore set forth. While both lithium and mercury, as well as the low melting point alloys discussed above, may be considered as relatively expensive reagents, each is recovered in substantially complete quantities and are re-amalgamated or re-alloyed for additional use. Thus, after the initial cost of these materials, the process may be carried out continuously for long periods of time with little or no expense caused by the necessity for adding either of the two materials. Also, the nitrogen is recovered in a highly usable form, either in the form of ammonia or aqueous solution thereof, while the oxygen released in the electrolysis cell is readily compressed and stored in tanks for further use, or utilized in any desired by-product reaction. While electrolysis, except in the presence of cheap electric power, might appear to involve considerable cost, a comparison of the cost of electrolysis with the cost, a comparison of the cost of electrolysis with the cost of pumping an inert gas for several hundred miles, without any use therefor at the end of the line, and also the increased value of the natural gas with the nitrogen removed, due to its considerably higher B. t. u. content, makes the process of this invention entirely feasible economically and highly desirable commercially.

While the use of the process of this invention in the treatment of natural gas containing nitrogen is a valuable application therefor, it will be understood that it may be used in the treatment of other gases and gaseous mixtures, which contain nitrogen, the removal of which is desirable. Examples of such gases are combustible gases other than natural gas, such as produced in refining of petroleum, or other gases produced in various chemical reactions or separations, which require purification, preferably free or substantially free from gases more reactive with lithium than nitrogen. It must be recognized, of course, that the presence of water vapor or free oxygen in the gaseous mixture reduces the available lithium for nitrogen removal, so that it may often prove economical to remove the water vapor or oxygen, as discussed previously, prior to reaction with the lithium.

Although the process of this invention has been described with particularity in connection with a preferred application, and other applications indicated, it will be understood that additional applications exist, and that various changes may be made in the process, in addition to those indicated, all without departing from the spirit and scope of this invention.

What is claimed is:

1. A method of removing nitrogen from a mixture of combustible gases containing nitrogen, which comprises contacting the gaseous mixture with an alloy of lithium and a low melting point, eutectic fusible alloy, at a temperature at which said lithium alloy is a liquid, so as to react nitrogen with lithium to form lithium nitride, said mixture having no lithium reactive components, other than nitrogen, which are present in an amount sufficient to prevent reaction between nitrogen and lithium under the reaction conditions; reacting said lithium nitride with water to produce ammonia and lithium hydroxide; and regenerating said alloy of lithium and said low melting point eutectic fusible alloy by electrolysis of said lithium hydroxide in the presence of said low melting point, eutectic fusible alloy.

2. A method of removing nitrogen from a mixture of combustible gases containing nitrogen, which comprises contacting said gaseous mixture with a lithium mercury amalgam to react lithium and nitrogen to form lithium nitride, said mixture having no lithium reactive components, other than nitrogen, which are present in an amount sufficient to prevent reaction between nitrogen and lithium under the reaction conditions; reacting said lithium nitride with water to form ammonia and lithium hydroxide; treating said lithium hydroxide by electrolysis in the presence of mercury to regenerate said lithium mercury amalgam; and reacting said amalgam with additional gaseous mixture containing nitrogen.

3. A method of removing nitrogen from a mixture of combustible gases containing nitrogen, which comprises passing said gaseous mixture in countercurrent relation to a low melting point lithium alloy in a first reaction zone at a temperature at which said alloy is liquid, to react lithium and nitrogen to form lithium nitride, said mixture having no lithium reactive components, other than nitrogen, which are present in an amount sufficient to prevent reaction between nitrogen and lithium under the reaction conditions; maintaining sufficient temperature in said reaction zone so that the reaction product from said alloy, after reaction of lithium with nitrogen, will be a liquid reaction product; removing said liquid reaction product and with it lithium nitride and any unreacted lithium alloy from said reaction zone, while returning a portion thereof to said reaction zone and passing the remainder to a second reaction zone; reacting said lithium nitride in said second reaction zone with water to form ammonia and lithium hydroxide; removing and treating said lithium hydroxide by electrolysis and concurrently regenerating said low melting point lithium alloy; and recycling said regenerated low melting point lithium alloy by passing the same to said first reaction zone.

4. A method of removing nitrogen from a mixture of combustible gases containing nitrogen, which comprises establishing a substantially vertical reaction zone; introducing said combustible mixture of gases containing nitrogen adjacent the lower end of said reaction zone; introducing adjacent the upper end of said reaction zone a low melting point lithium alloy at a temperature at which said alloy is a liquid; causing said lithium alloy to flow downwardly in said reaction zone to produce contact between said lithium alloy and said combustible mixture of gases containing nitrogen, thereby reacting said lithium with nitrogen to form lithium nitride, said mixture having no lithium reactive components, other than nitrogen, which are present in an amount sufficient to prevent reaction between nitrogen and lithium under the reaction conditions; maintaining sufficient temperature in said reaction zone so that the reaction product from said alloy, after reaction of lithium with nitrogen, will be a liquid reaction product; removing the combustible mixture of gases, after such contact with said lithium alloy, from the upper end of said reaction zone; removing the said liquid reaction product and any unreacted liquid lithium alloy from the lower end of said reaction zone, said liquid reaction product and any unreacted lithium alloy carrying with it the said lithium nitride produced by the reaction between lithium and nitrogen in said reaction zone; reacting said lithium nitride with water to form ammonia and lithium hydroxide; and treating said lithium hydroxide by electrolysis, and concurrently regenerating said low melting point lithium alloy.

5. In a method of removing nitrogen from a mixture of combustible gases and nitrogen, as defined in claim 4, wherein said mixture is anhydrous.

6. In a method of removing nitrogen from a mixture of combustible gases and nitrogen, as defined in claim 4, wherein said mixture contains water vapor, the step of first removing said water vapor.

7. In a method of removing nitrogen from a mixture of combustible gases and nitrogen, the steps of contacting such gaseous mixture with a low melting point lithium alloy at a temperature at which said alloy is a liquid, so as to react said lithium with nitrogen to form lithium nitride, said mixture having no lithium reactive components, other than nitrogen, which are present in an amount sufficient to prevent a reaction between nitrogen and lithium under the reaction conditions; maintaining sufficient temperature so that the reaction product from said alloy, after reaction of lithium with nitrogen, will be a liquid reaction product; removing said liquid reaction product and any unreacted liquid alloy so as to remove lithium nitride therewith; reacting said lithium nitride with water to form ammonia and lithium hydroxide; and treating said lithium hydroxide by electrolysis, and concurrently regenerating said low melting point lithium alloy.

8. A method of removing nitrogen from a mixture of combustible gases containing nitrogen, which comprises establishing a substantially vertical reaction zone; introducing said combustible mixture of gases containing nitrogen adjacent the lower end of said reaction zone; introducing adjacent the upper end of said reaction zone a lithium mercury amalgam, said mixture having no lithium reactive components, other than nitrogen, which are present in an amount sufficient to prevent reaction between nitrogen and lithium under the reaction conditions; causing said amalgam to flow downwardly in said reaction zone to produce contact between said amalgam and said combustible mixture of gases containing nitrogen, thereby reacting said lithium with nitrogen to form lithium nitride; removing the combustible mixture of gases, after such contact with said amalgam, from the upper end of said reaction zone; removing lithium nitride, mercury and any unreacted amalgam from the lower end of said reaction zone; reacting said lithium nitride with water to form lithium hydroxide; and treating said lithium hydroxide by electrolysis, in the presence of mercury, to regenerate said lithium mercury amalgam.

FREDERICK A. ROHRMAN.

References Cited in the file of this patent

UNITED STATES PATENTS

| Number | Name | Date |
|---|---|---|
| 452,030 | Castner | May 12, 1891 |
| 679,997 | Scholl | Aug. 6, 1901 |
| 971,198 | Hulin | Sept. 27, 1910 |
| 1,106,436 | Ascraft | Aug. 11, 1914 |
| 1,191,799 | Labhardt | July 18, 1916 |
| 1,913,145 | Wait | June 6, 1933 |
| 2,148,404 | Gilbert | Feb. 21, 1939 |

FOREIGN PATENTS

| Number | Country | Date |
|---|---|---|
| 199,027 | Great Britain | Apr. 24, 1924 |
| 258,753 | Canada | |

(Canadian Pat. Off. Record, v. 54 (1926), p. 583.)

OTHER REFERENCES

J. W. Mellor's "A Comprehensive Treatise on Inorganic and Theoretical Chemistry," vol. 2, 1922 ed., pages 469, 470; vol. 8, 1928 ed., pages 97 and 98. Longmans, Green and Co., N. Y.

"Removal of Nitrogen from Natural Gas," by Henry N. Wade. Reprinted from the Mines Magazine for December 1948.